United States Patent
Sakuragi (10) Patent No.: US 12,511,087 B2
(45) Date of Patent: Dec. 30, 2025

(54) DISPLAY CONTROL APPARATUS, DISPLAY CONTROL METHOD, AND DISPLAY CONTROL PROGRAM

(71) Applicant: FUJIFILM Corporation, Tokyo (JP)

(72) Inventor: Futoshi Sakuragi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/594,016

(22) Filed: Mar. 4, 2024

(65) Prior Publication Data
US 2024/0311067 A1 Sep. 19, 2024

(30) Foreign Application Priority Data
Mar. 13, 2023 (JP) .................................. 2023-038540

(51) Int. Cl.
*G06F 3/14* (2006.01)

(52) U.S. Cl.
CPC ...................................... *G06F 3/14* (2013.01)

(58) Field of Classification Search
CPC .......... G06F 3/14; G06F 3/0481; G06F 3/048; G06F 2203/04803; G06F 2203/04806; G09G 2340/045; G09G 2380/08; G09G 5/14
See application file for complete search history.

(56) References Cited

U.S. PATENT DOCUMENTS

| | | | | |
|---|---|---|---|---|
| 2013/0147731 | A1* | 6/2013 | Adachi | G06F 3/04883 345/173 |
| 2015/0301732 | A1* | 10/2015 | Henderson | G06T 7/0012 715/781 |
| 2015/0317026 | A1* | 11/2015 | Choi | G06F 3/0481 345/660 |
| 2019/0220681 | A1* | 7/2019 | Sakashita | H04N 1/00413 |

FOREIGN PATENT DOCUMENTS

| | | |
|---|---|---|
| JP | 2010009418 | 1/2010 |
| JP | 2019125053 | 7/2019 |

* cited by examiner

*Primary Examiner* — Brent D Castiaux
(74) *Attorney, Agent, or Firm* — JCIPRNET (57) ABSTRACT

A processor is configured to display a display screen including a plurality of display regions, each of which has at least one image disposed thereon, and an operation instruction region for giving an instruction to operate the image, and on which the plurality of display regions and the operation instruction region are initially disposed, receive selection of at least one display region of the plurality of display regions, reduce another display region other than the selected display region together with a disposed image and enlarge the selected display region together with a disposed image, and superimpose the operation instruction region on a region other than a region of interest in the image disposed in the enlarged display region.

13 Claims, 7 Drawing Sheets

DISPLAY CONTROL APPARATUS, DISPLAY CONTROL METHOD, AND DISPLAY CONTROL PROGRAM

CROSS REFERENCE TO RELATED APPLICATIONS

The present application claims priority from Japanese Patent Application No. 2023-038540, filed on Mar. 13, 2023, the entire disclosure of which is incorporated herein by reference.

BACKGROUND

Technical Field

The present disclosure relates to a display control apparatus, a display control method, and a display control program.

Related Art

Regarding medical three-dimensional images acquired by a computed tomography (CT) apparatus, a magnetic resonance imaging (MRI) apparatus, or the like, the image may be viewed in various display methods such as display of various tomographic planes such as axial, sagittal, and coronal, display of any tomographic plane, or three-dimensional display by means of volume rendering or the like. In a case where an X-ray image or an ultrasound image of the same patient is acquired in addition to the three-dimensional image, these images are also viewed together. In this case, a display screen is divided into a plurality of viewer regions, such as 2×2, and various images are displayed in each of the viewer regions. In addition, in a case where the images are displayed in the plurality of viewer regions in this manner, a method has been proposed in which a selected image is displayed in an enlarged manner and the other images are displayed in a reduced size on the display screen (for example, see JP2019-125053A and JP2010-009418A).

On the other hand, in many cases, an operation instruction region for performing an operation on the image is always displayed on the display screen in a region different from the display region in which the image is disposed. However, in this case, since the operation instruction region constantly occupies a part of the display screen, the display region is always narrowed. Therefore, a display of the operation instruction region as a floating controller that can be freely moved on the display screen has been proposed.

However, as described above, in a case in which the display screen is divided into the plurality of display regions and the images are disposed, one display region is small, and thus the image disposed in the display region is also small. In this case, the operation instruction region may overlap the region of interest that should be noted in the displayed image. Further, in a case where an image selected by using the methods disclosed in JP2019-125053A and JP2010-009418A is enlarged, the controller tends to overlap the enlarged image. In such a case, it is necessary for the operator to perform an operation of moving the operation instruction region.

SUMMARY OF THE INVENTION

The present invention has been made in view of the above circumstances, and an object of the present invention is to reduce a time and an effort for an operation of an operator in a case of viewing an image.

According to an aspect of the present disclosure, there is provided a display control apparatus comprising at least one processor,
in which the processor is configured to:
display a display screen including a plurality of display regions, each of which has at least one image disposed thereon, and an operation instruction region for giving an instruction to operate the image, and on which the plurality of display regions and the operation instruction region are initially disposed;
receive selection of at least one display region of the plurality of display regions;
reduce another display region other than the selected display region together with a disposed image and enlarge the selected display region together with a disposed image; and
superimpose the operation instruction region on a region other than a region of interest in the image disposed in the enlarged display region.

In the display control apparatus according to the aspect of the present disclosure, the processor may be configured to,
in a case where selection of at least one display region different from the enlarged display region is received, enlarge the different display region together with a disposed image, and reduce a display region other than the different display region together with a disposed image, and
superimpose the operation instruction region on a region other than a region of interest in the image disposed in the enlarged different display region.

In addition, in the display control apparatus according to the aspect of the present disclosure, the processor may be configured to enlarge and reduce the plurality of display regions in a state where a relative position between the plurality of display regions is maintained.

In addition, in the display control apparatus according to the aspect of the present disclosure, the processor may be configured to receive selection of the display region by hovering a cursor by an operator.

In addition, in the display control apparatus according to the aspect of the present disclosure, the processor may be configured to reduce the other display region other than the selected display region to a predetermined minimum size, and
enlarge the selected display region to a maximum size suitable for a free region other than the reduced other display region on the display screen.

In addition, in the display control apparatus according to the aspect of the present disclosure, the processor may be configured to deform the reduced other display region such that the free region other than the enlarged display region and the reduced other display region is filled on the display screen.

In addition, in the display control apparatus according to the aspect of the present disclosure, the processor may be configured to set the minimum size according to an image disposed in the display region.

In addition, in the display control apparatus according to the aspect of the present disclosure, the processor may be configured to synchronously enlarge the selected two or more display regions, in a case where selection of two or more display regions is received.

In addition, in the display control apparatus according to the aspect of the present disclosure, the processor may be configured to return the plurality of display regions and the operation instruction region to the initial disposition, in a case where selection of the display region is released.

In addition, in the display control apparatus according to the aspect of the present disclosure, the processor may be configured to prohibit reduction of a display region, which is set to be non-reducible, from the initial disposition.

According to another aspect of the present disclosure, there is provided a display control method causing a computer to execute:

displaying a display screen including a plurality of display regions, each of which has at least one image disposed thereon, and an operation instruction region for giving an instruction to operate the image, and on which the plurality of display regions and the operation instruction region are initially disposed;

receiving selection of at least one display region of the plurality of display regions;

reducing another display region other than the selected display region together with a disposed image and enlarging the selected display region together with a disposed image; and superimposing the operation instruction region on a region other than a region of interest in the image disposed in the enlarged display region.

According to still another aspect of the present disclosure, there is provided a display control program causing a computer to execute:

a procedure of displaying a display screen including a plurality of display regions, each of which has at least one image disposed thereon, and an operation instruction region for giving an instruction to operate the image, and on which the plurality of display regions and the operation instruction region are initially disposed;

a procedure of receiving selection of at least one display region of the plurality of display regions;

a procedure of reducing another display region other than the selected display region together with a disposed image and enlarging the selected display region together with a disposed image; and a procedure of superimposing the operation instruction region on a region other than a region of interest in the image disposed in the enlarged display region.

According to the present disclosure, it is possible to reduce a time and an effort for an operation of an operator in a case of viewing an image.

DETAILED DESCRIPTION

Figure 1:
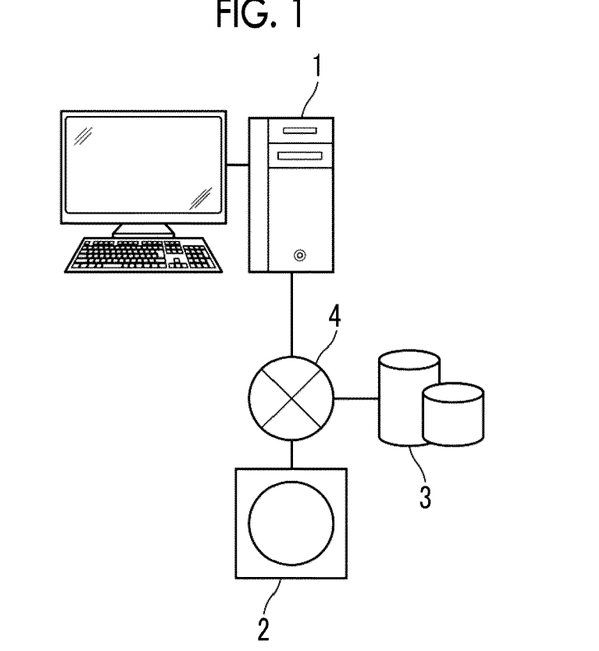
FIG. 1 is a diagram showing a schematic configuration of a diagnosis support system to which a display control apparatus according to an embodiment of the present disclosure is applied.

In the following, embodiments of the present disclosure will be explained with reference to the drawings. First, a configuration of a medical information system to which a display control apparatus according to the present embodiment is applied will be described. FIG. 1 is a diagram showing a schematic configuration of the medical information system. In the medical information system shown in FIG. 1, a computer 1 including the display control apparatus according to the present embodiment, an imaging apparatus 2, and an image storage server 3 are connected via a network 4 in a communicable state.

The computer 1 includes the display control apparatus according to the present embodiment, and a display control program according to the present embodiment is installed in the computer 1. The computer 1 may be a workstation or a personal computer directly operated by a doctor who makes a diagnosis, or may be a server computer connected to the workstation or the personal computer via the network. The display control program is stored in a storage device of the server computer connected to the network or in a network storage to be accessible from the outside, and is downloaded and installed in the computer 1 used by the doctor, in response to a request. Alternatively, the display control program is distributed in a state of being recorded on a recording medium, such as a digital versatile disc (DVD) or a compact disc read only memory (CD-ROM), and is installed in the computer 1 from the recording medium.

The imaging apparatus 2 is an apparatus that images a diagnosis target part of a subject to generate a medical image showing the part and includes, specifically, various modalities such as a CT apparatus, an MRI apparatus, a positron emission tomography (PET) apparatus, an X-ray imaging apparatus, and an ultrasonic imaging apparatus. A three-dimensional image, an X-ray image, an ultrasound image, and the like (hereinafter, referred to as a medical image) including a plurality of tomographic images, which are generated by the imaging apparatus 2, are transmitted to and stored in the image storage server 3.

The image storage server 3 is a computer that stores and manages various types of data, and comprises a large-capacity external storage device and database management software. The image storage server 3 communicates with another device via the wired or wireless network 4, and transmits and receives image data of the medical image and the like to and from the other device. Specifically, various types of data including the image data of the medical image generated by the imaging apparatus 2 are acquired via the network and stored in a recording medium such as a large-capacity external storage device and managed. It should be noted that a storage format of the image data and the communication between the devices via the network 4 are based on a protocol, such as digital imaging and communication in medicine (DICOM).

Figure 2:
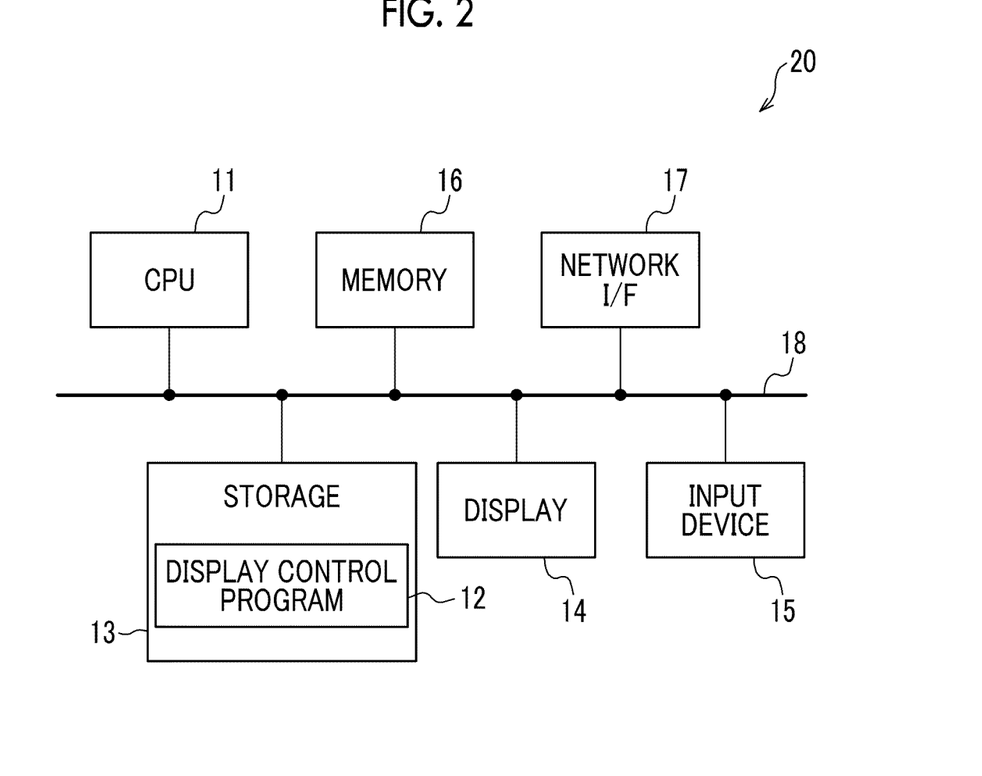
FIG. 2 is a diagram showing a hardware configuration of the display control apparatus according to the present embodiment.

Next, the display control apparatus according to the present embodiment will be described. FIG. 2 is a diagram showing a hardware configuration of the display control apparatus according to the present embodiment. As shown in FIG. 2, a display control apparatus 20 includes a central processing unit (CPU) 11, a non-volatile storage 13, and a memory 16 as a temporary storage area. Moreover, the display control apparatus 20 includes a display 14, such as a liquid crystal display, an input device 15, such as a keyboard and a mouse, and a network interface (I/F) 17 connected to the network 4. The CPU 11, the storage 13, the display 14, the input device 15, the memory 16, and the network I/F 17 are connected to a bus 18. Note that the CPU 11 is an example of a processor according to the present disclosure.

The storage 13 is realized by a hard disk drive (HDD), a solid state drive (SSD), a flash memory, and the like. A display control program 12 is stored in the storage 13 as a storage medium. The CPU 11 reads out the display control program 12 from the storage 13, loads the read-out program into the memory 16, and executes the loaded display control program 12.

Figure 3:
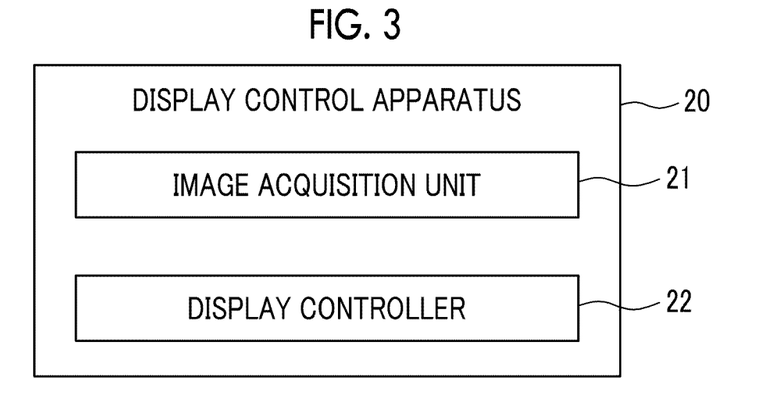
FIG. 3 is a functional configuration diagram of the display control apparatus according to the present embodiment.

Next, a functional configuration of the display control apparatus according to the present embodiment will be described. FIG. 3 is a diagram showing a functional configuration of the display control apparatus according to the present embodiment. As illustrated in FIG. 3, the display control apparatus 20 comprises an image acquisition unit 21 and a display controller 22. Then, the CPU 11 executes the display control program 12, so that the CPU 11 functions as the image acquisition unit 21 and the display controller 22.

The image acquisition unit 21 acquires a plurality of the medical images that are a viewing target from the image storage server 3 in response to an instruction from the input device 15 by an operator. The plurality of medical images include medical images acquired by different modalities for the same patient, as well as medical images acquired by the same modality and having different imaging times for the same patient. In some cases, a medical image of another patient may be used as one of the plurality of medical images for comparison.

The display controller 22 controls display of the plurality of medical images on the display 14. Hereinafter, the processing performed by the display controller 22 will be described.

Figure 4:
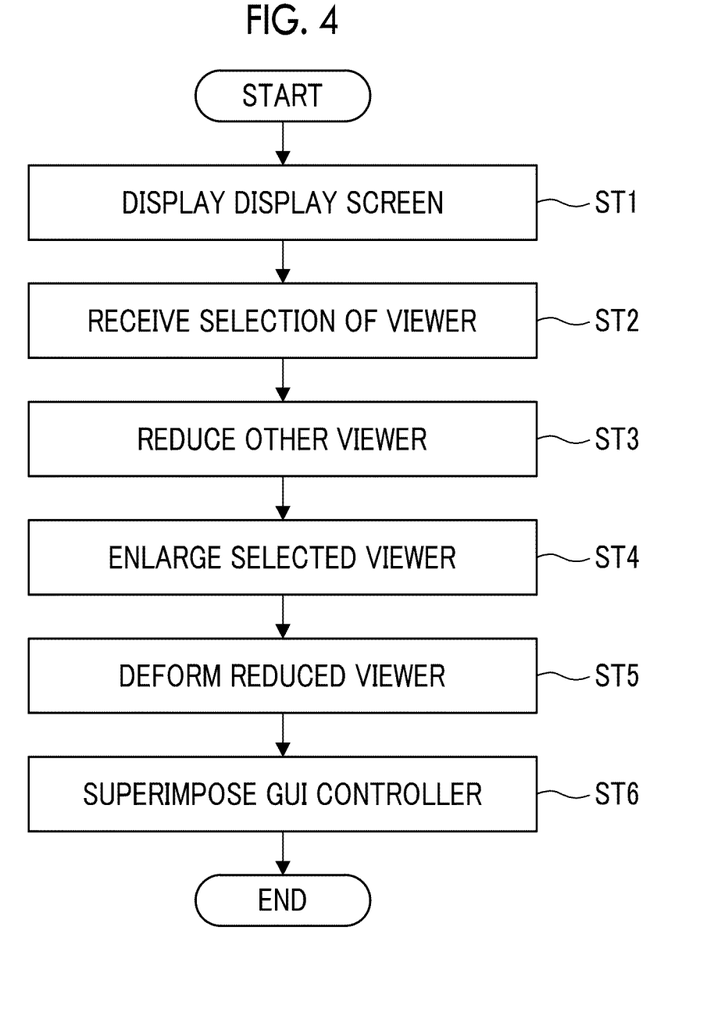
FIG. 4 is a flowchart showing processing performed in the present embodiment.

FIG. 4 is a flowchart showing processing performed in the present embodiment. It is assumed that the medical image to be displayed is acquired by the image acquisition unit 21 and stored in the storage 13. In a case where the operator gives an instruction for image display from the input device 15, the display controller 22 displays a display screen of the medical image on the display 14 (step ST1).

Figure 5:
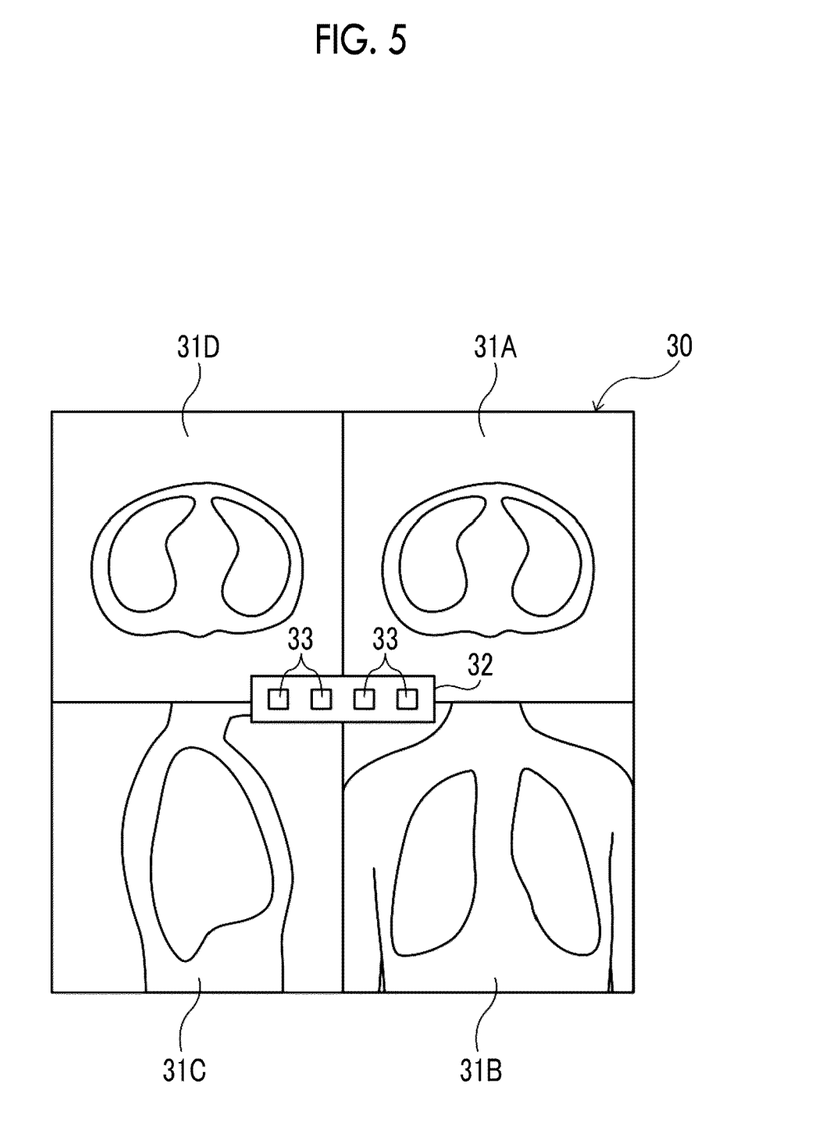
FIG. 5 is a diagram showing a display screen (initial disposition).

FIG. 5 is a diagram showing a display screen displayed on the display 14. As illustrated in FIG. 5, the display screen 30 includes a total of four viewers 31A to 31D disposed two vertically and two horizontally. The viewers 31A to 31D are regions in which the medical images are disposed on the display screen 30, respectively. The display screen 30 includes a graphic user interface (GUI) controller 32 for operating at least one medical image to be disposed in the viewers 31A to 31D. The GUI controller 32 is a floating controller that can be freely moved with respect to the display screen 30. Here, the viewers 31A to 31D correspond to the display regions of the present disclosure, and the GUI controller 32 corresponds to the operation instruction region of the present disclosure.

The medical images acquired by the image acquisition unit 21 are disposed in the viewers 31A to 31D, respectively. Only one medical image or the plurality of medical images may be displayed on each of the viewers 31A to 31D. In a case where the number of acquired medical images is less than four, the viewer in which the images are not disposed is included. In a case where the number of acquired medical images is five or more, four or less medical images selected by the operator are disposed in the viewers 31A to 31D.

The GUI controller 32 includes various buttons 33 for giving an operation instruction on the medical image disposed in the selected viewer among the four viewers 31A to 31D. Examples of the operation for the medical image include operation of enlarging, reducing, rotating, and moving the disposed medical image. Additionally, in a case where the disposed medical image is a three-dimensional image, an example of the operation includes switching the tomographic plane to be displayed.

Here, in a case where an instruction to display the display screen is given, the viewers 31A to 31D and the GUI controller 32 are initially disposed on the display screen 30. That is, the four viewers 31A to 31D are equally disposed on the display screen 30. Further, the GUI controller 32 is disposed in a region other than the region of interest in the medical images disposed in the four viewers 31A to 31D, that is, in a region that does not overlap the region of interest. Although a region of a subject other than a background included in the medical image is the region of interest, but a local region such as a lesion in the region of the subject may be the region of interest. Such the region of interest is often included in the vicinity of the center of the medical image. Therefore, in the present embodiment, in the initial disposition, the GUI controller 32 is disposed at a center of the display screen 30 in which corner portions of the four viewers 31A to 31D are in contact with each other.

The operator selects any viewer of the four viewers 31A to 31D included in the display screen 30, which is desired to be enlarged, using the input device 15. The display controller 22 receives the selection of the viewer by the operator (step ST2). In a case where the viewer is selected, the display controller 22 performs processing of enlarging and reducing the viewer.

Figure 6:
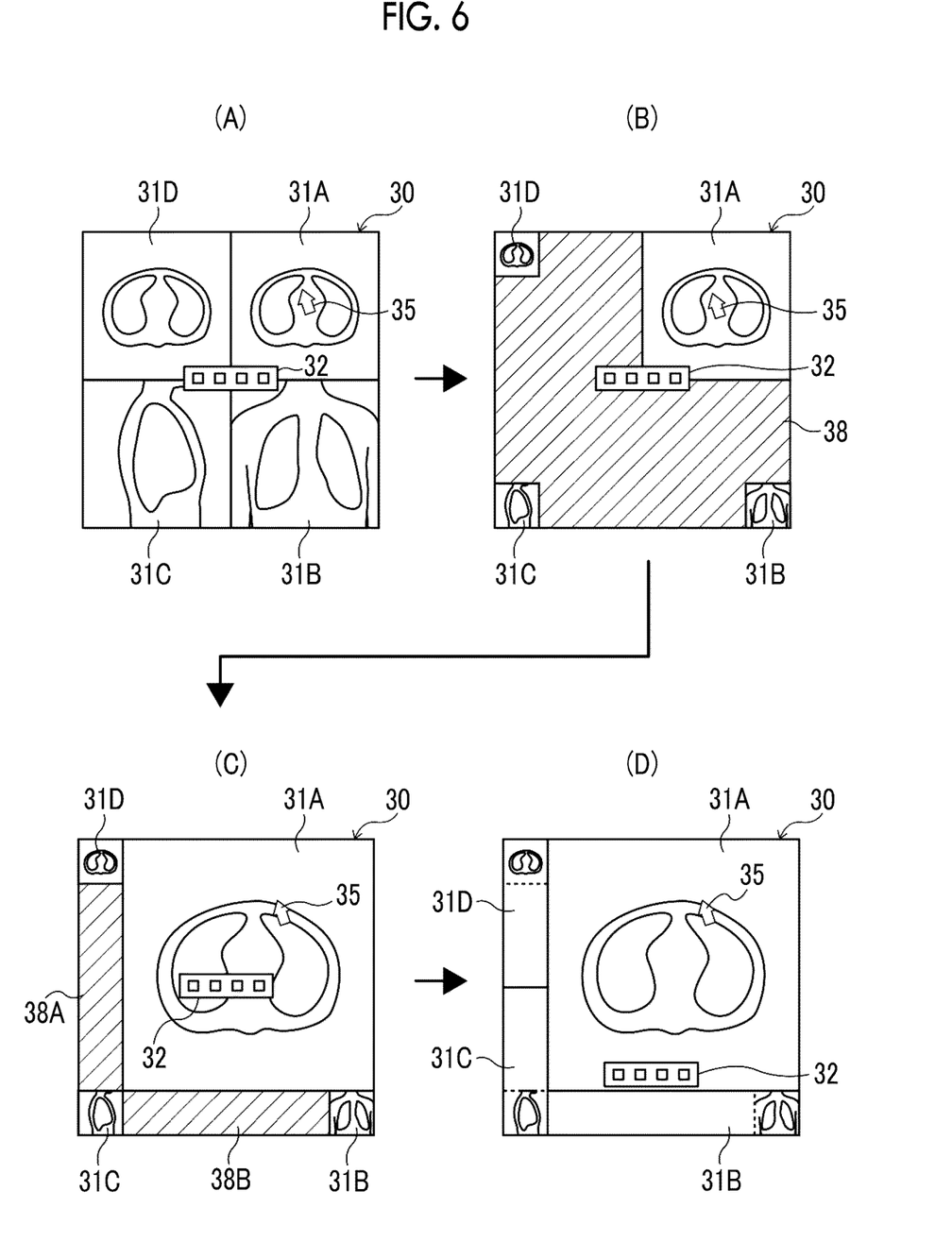
FIG. 6 is a diagram illustrating enlargement and reduction of a viewer on a display screen.

FIG. 6 is a diagram illustrating enlargement and reduction of the viewer on the display screen. In the present embodiment, the viewer is selected by hovering a mouse cursor 35 displayed on the display 14 as shown in (A) of FIG. 6. The term "hovering" is an operation of moving the mouse cursor 35 to be superimposed on the viewer to be selected. The viewer may be selected by an operation of moving the mouse cursor 35 and then clicking the mouse instead of hovering. In a case where the display 14 is a touch panel type, the selection may be received by a touch on the displayed viewer. In (A) of FIG. 6, it is assumed that the viewer 31A is selected.

In a case where the viewer is selected, the display controller 22 reduces the other viewers other than the selected viewer together with the disposed medical image (step ST3). That is, as shown in (B) of FIG. 6, three viewers 31B to 31D other than the selected viewer 31A are reduced. In this case, relative positions of the four viewers 31A to 31D are maintained.

Here, the size to be reduced is a predetermined minimum size. The minimum size may be determined by the number of pixels (for example, 128×128) or may be determined by a predetermined ratio (for example, 10%) with respect to the size of the display screen 30. Further, in the present embodiment, since the viewer is selected by the mouse cursor 35, the minimum size that can be hovered by the mouse cursor 35, that is, the minimum size that can be completely superimposed with the mouse cursor 35 may be set as the minimum size.

As shown in (B) of FIG. 6, the display controller 22 reduces the viewers 31B to 31D while maintaining the same aspect ratio as the initial disposition shown in FIG. 5. In addition, in (B) of FIG. 6, hatching is applied to a free region 38 in which the viewers 31A to 31D are not present on the display screen 30.

Next, as shown in (C) of FIG. 6, the display controller 22 enlarges the selected viewer 31A together with the disposed medical image (step ST4). In this case, the display controller 22 enlarges the selected viewer 31A to have a maximum size suitable for the free region 38 other than the reduced viewers 31B to 31D while maintaining the aspect ratio of the initial disposition. That is, the selected viewer 31A is enlarged to fit in the free region 38 as much as possible. Here, in the present embodiment, sizes of the reduced viewers 31B to 31D are determined with respect to the size of the display screen 30. Therefore, a length of one side with which the selected viewer 31A can be enlarged to the maximum can be calculated. The display controller 22 enlarges the selected viewer 31A to have the length of one side calculated under a condition that the aspect ratio is constant.

In a state where the selected viewer 31A is enlarged, as illustrated in (C) of FIG. 6, the free regions 38A and 38B are still present on the display screen 30. The processing of enlarging display of the selected viewer 31A may be ended in this state. However, in the present embodiment, the display controller 22 deforms the reduced viewers 31B to 31D to fill the free regions 38A and 38B (step ST5).

For example, as shown in (D) of FIG. 6, the display controller 22 deforms each of the reduced viewers 31C and 31D to be vertically elongated so as to fill the vertically long free region 38A, and deforms the reduced viewer 31B to fill the horizontally long free region 38B. It should be noted that, even in a case where the viewers 31B to 31D are deformed, the medical images disposed in the viewers 31B to 31D are not deformed. In (D) of FIG. 6, boundaries of the medical images disposed in the deformed viewers 31B to 31D are indicated by broken lines.

Further, the display controller 22 superimposes the GUI controller 32 on a region other than the region of interest in the medical image disposed in the enlarged viewer 31A (step ST6), and ends the processing. Here, examples of the region other than the region of interest in the medical image include a background region other than a subject region included in the medical image. It should be noted that, depending on the size of the medical image or the size of the subject included in the medical image, the subject region and the GUI controller 32 may not be avoided from overlapping each other. In such a case, the display controller 22 calculates a position at which the overlap between the subject region and the GUI controller 32 is minimized, and superimposes the GUI controller 32 on the calculated position.

It should be noted that, after the selected viewer 31A is enlarged, a viewer different from the viewer 31A may be selected. Hereinafter, the processing in this case will be described.

Figure 7:
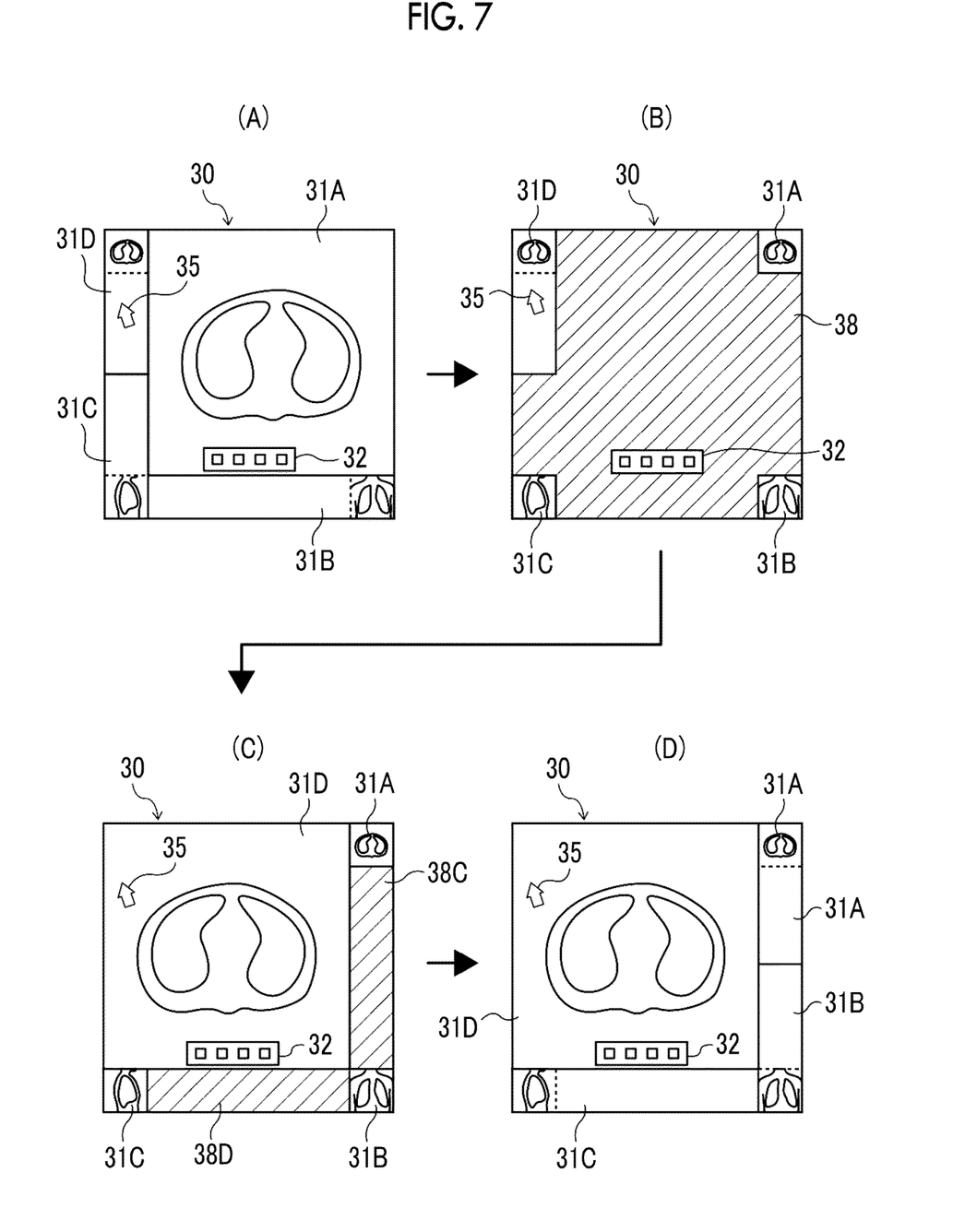
FIG. 7 is a diagram illustrating enlargement and reduction of the viewer on the display screen.

FIG. 7 is a diagram illustrating enlargement and reduction of the viewer in a case where different viewers are selected. In a case where a viewer 31D different from the enlarged viewer 31A is selected as shown in (A) of FIG. 7, the display controller 22 reduces the other viewers 31A, 31B, and 31C other than the selected viewer 31D together with the disposed medical images as shown in (B) of FIG. 7. Even in this case, the relative positions of the four viewers 31A to 31D are maintained.

Next, as shown in (C) of FIG. 7, the display controller 22 enlarges the selected viewer 31D together with the disposed medical image. In this case, as in (C) of FIG. 6, the display controller 22 enlarges the selected viewer 31D to have a maximum size suitable for the free region 38 other than the reduced viewers 31A to 31C while maintaining the aspect ratio of the initial disposition. That is, the selected viewer 31D is enlarged to fit in the free region 38 as much as possible.

Subsequently, the display controller 22 deforms the reduced viewers 31A to 31C to fill remaining free regions 38C and 38D even after the selected viewer 31D is enlarged. For example, as shown in (D) of FIG. 7, the display controller 22 deforms each of the reduced viewers 31A and 31B to be vertically elongated so as to fill the vertically long free region 38C, and deforms the reduced viewer 31C to fill the horizontally long free region 38D. It should be noted that, even in a case where the viewers 31A to 31C are deformed, the medical images disposed in the viewers 31A to 31D are not deformed. In (D) of FIG. 7, the boundaries of the medical images disposed in the deformed viewers 31A to 31D are indicated by broken lines.

Further, the display controller 22 superimposes the GUI controller 32 on a region other than the region of interest in the medical image disposed in the enlarged viewer 31D, and ends the processing.

In a case where the operator moves the mouse cursor 35 to a position other than the display screen 30, the display controller 22 may return the viewers 31A to 31D and the GUI controller 32 to the initial disposition shown in FIG. 5. It should be noted that, the size of the display screen 30 may match a size of the entire screen of the display 14. In such a case, the display screen 30 may be returned to the initial disposition by moving the mouse cursor 35 to an edge of the display screen 30.

As described above, in the present embodiment, the viewer selected from the plurality of viewers 31A to 31D is enlarged together with the disposed medical image, the viewers other than the selected viewer are reduced together with the disposed medical images, and the GUI controller 32 is superimposed on the region other than the region of interest in the medical image disposed in the enlarged viewer. For this reason, the operator can move the GUI controller 32 to a position that does not interfere with the medical image disposed in the enlarged viewer without performing an operation of moving the GUI controller 32. Therefore, it is possible to reduce the time and effort for an operation by the operator.

In addition, in a case where the viewer 31D different from the enlarged viewer 31A in a state where the viewer 31A is enlarged is selected, the viewer 31D is enlarged together with the image disposed in the viewer 31D, the other viewers 31A to 31C other than the viewer 31D are reduced together with the disposed image, and the GUI controller 32 is superimposed on the region other than the region of interest in the medical image disposed in the enlarged viewer 31D. For this reason, the operator can move the GUI controller 32 to a position that does not interfere with the medical image disposed in the enlarged viewer without performing an operation of moving the GUI controller 32, while sequentially enlarging the desired medical image. Therefore, it is possible to reduce the time and effort for an operation by the operator.

Further, since the operation of clicking the mouse is not necessary by selecting the viewer by means of the hover operation of the mouse cursor 35, it is possible to reduce a burden of the operation of the operator who selects the viewer.

In addition, by enlarging and reducing the plurality of viewers 31A to 31D in a state where the relative positions of the plurality of viewers 31A to 31D are maintained, the relative positional relationship between the plurality of viewers 31A to 31D is maintained even in a case where the viewer is enlarged. Therefore, in a case of viewing the medical image, confusion due to the change in the location of the displayed medical image on the display screen 30 does not occur.

In addition, in a case of reducing the viewer, the viewer other than the selected viewer is reduced to a predetermined minimum size, and the selected viewer is enlarged to a maximum size suitable for the free region 38 other than the viewer that is reduced on the display screen 30. Thereby, the selected viewer can be enlarged to a maximum size that can be obtained on the display screen 30. In addition, the viewer other than the selected viewer can be reduced so as to be selectable with the mouse cursor 35.

Further, on the display screen 30, the reduced viewer can be enlarged by deforming the reduced viewer to fill the free region 38 other than the enlarged viewer and the reduced viewer. Therefore, the selection by the mouse cursor 35 with respect to the reduced viewer can be easily performed.

In the above-described embodiment, the viewer other than the selected viewer is reduced to a predetermined minimum size. In this case, the minimum size may be set in accordance with the medical image to be disposed in the viewer. It is easy to confirm that an X-ray image is an X-ray image even in a case where the X-ray image is reduced. However, it is difficult to confirm that the three-dimensional image, such as a CT image and an MRI image, is a CT image or an MRI image in a case where the three-dimensional image is reduced.

For this reason, in a case where the medical image disposed in the viewer is the X-ray image, the minimum size may be made smaller than in a case where the CT image or the MRI image is disposed, and in a case where the medical image is the CT image or the MRI image, the minimum size may be set to be larger than in a case where the X-ray image is disposed.

In a case of viewing the medical image, the past medical image of the same patient is compared with the latest medical image to check the progress of the disease. In addition, a comparison between the medical images before and after the surgery is performed to check the progress of the surgery. Therefore, the plurality of viewers each including the medical images to be compared may be simultaneously selected. In this case, the plurality of viewers may be selected by pressing a specific key (for example, a ctrl key) of the keyboard and hovering the mouse cursor 35 over the plurality of viewers. In a case where the plurality of viewers are selected, the display controller 22 synchronizes and enlarges the plurality of selected viewers.

Figure 8:
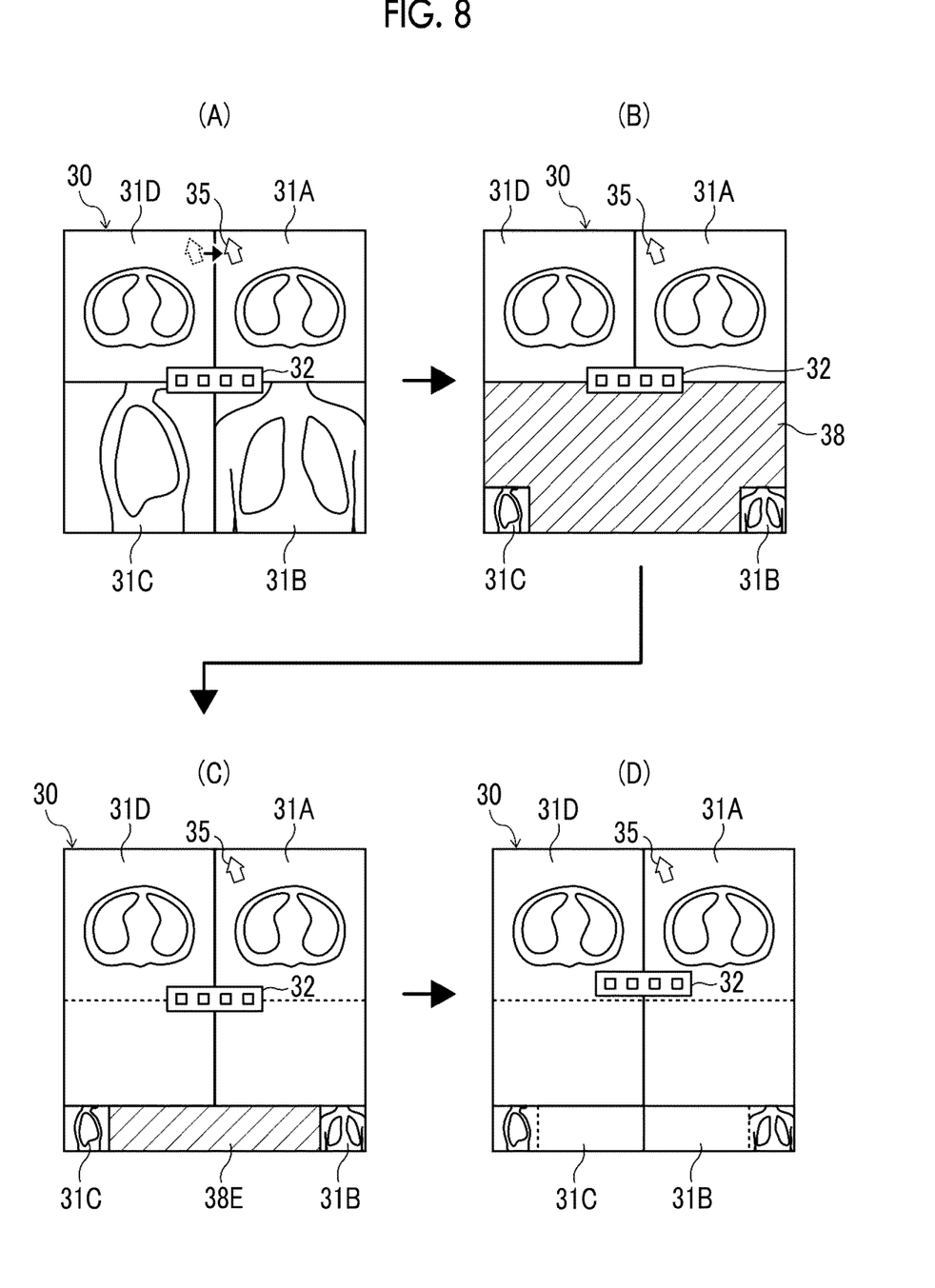
FIG. 8 is a diagram illustrating enlargement and reduction of the viewer on the display screen.

FIG. 8 is a diagram illustrating enlargement and reduction of the viewer in a case where the plurality of viewers are selected. As shown in (A) of FIG. 8, it is assumed that the display controller 22 receives the selection of the viewer 31A and the viewer 31D. The operator selects the viewer 31D first and then selects the viewer 31A, and this is represented in (A) of FIG. 8 by showing the mouse cursor 35 with a broken line in the viewer 31D, and showing the mouse cursor 35 with a solid line in the viewer 31A.

As shown in (B) of FIG. 8, the display controller 22 reduces the viewers 31B and 31C other than the selected viewers 31A and 31D together with the disposed medical image. Even in this case, the relative positions of the four viewers 31A to 31D are maintained.

Next, as shown in (C) of FIG. 8, the display controller 22 enlarges the selected viewers 31A and 31D. In this case, as in FIG. 6, the display controller 22 enlarges the selected viewers 31A and 31D to have a maximum size suitable for the free region 38 other than the reduced viewers 31B and 31C. That is, the selected viewers 31A and 31D are enlarged to fit in the free region 38 as much as possible. In (C) of FIG. 8, the aspect ratio in the case where the selected viewers 31A and 31D are enlarged is not maintained, but the aspect ratio of the medical images disposed in the enlarged viewers 31A and 31D is maintained. In (C) of FIG. 8, the boundaries of the medical images disposed in the enlarged viewers 31A and 31D are indicated by broken lines. In (C) of FIG. 8, the medical images disposed in the viewers 31A and 31D are not enlarged as a result.

Subsequently, the display controller 22 deforms the reduced viewers 31B and 31C to fill a remaining free region 38E even after the viewers 31A and 31D are enlarged. For example, as shown in (D) of FIG. 8, the reduced viewers 31B and 31C are deformed to fill the horizontally long free region 38E. It should be noted that, even in a case where the viewers 31B and 31C are deformed, the medical images disposed in the viewers 31B and 31C are not deformed.

Further, the display controller 22 superimposes the GUI controller 32 on a region other than the region of interest in the medical image disposed in the enlarged viewers 31A and 31D, and ends the processing.

In addition, in the above-described embodiment, at least one viewer may be set to be non-reducible, and the viewer set to be non-reducible may be prohibited from being reduced from the initial disposition. In this case, for example, the latest medical image of the patient is disposed in the viewer set to be non-reducible, and the past medical image of the same patient is disposed in the other viewers. As a result, the comparison between the past medical image of the patient and the latest medical image is performed.

Here, the prohibition of the reduction from the initial disposition includes both not reducing or enlarging the size displayed in the initial disposition and not reducing the size but enlarging the size. The setting of to be non-reducible may be performed in response to the instruction from the operator, or a viewer set to be non-reducible may be determined in advance by setting of the apparatus.

Figure 9:
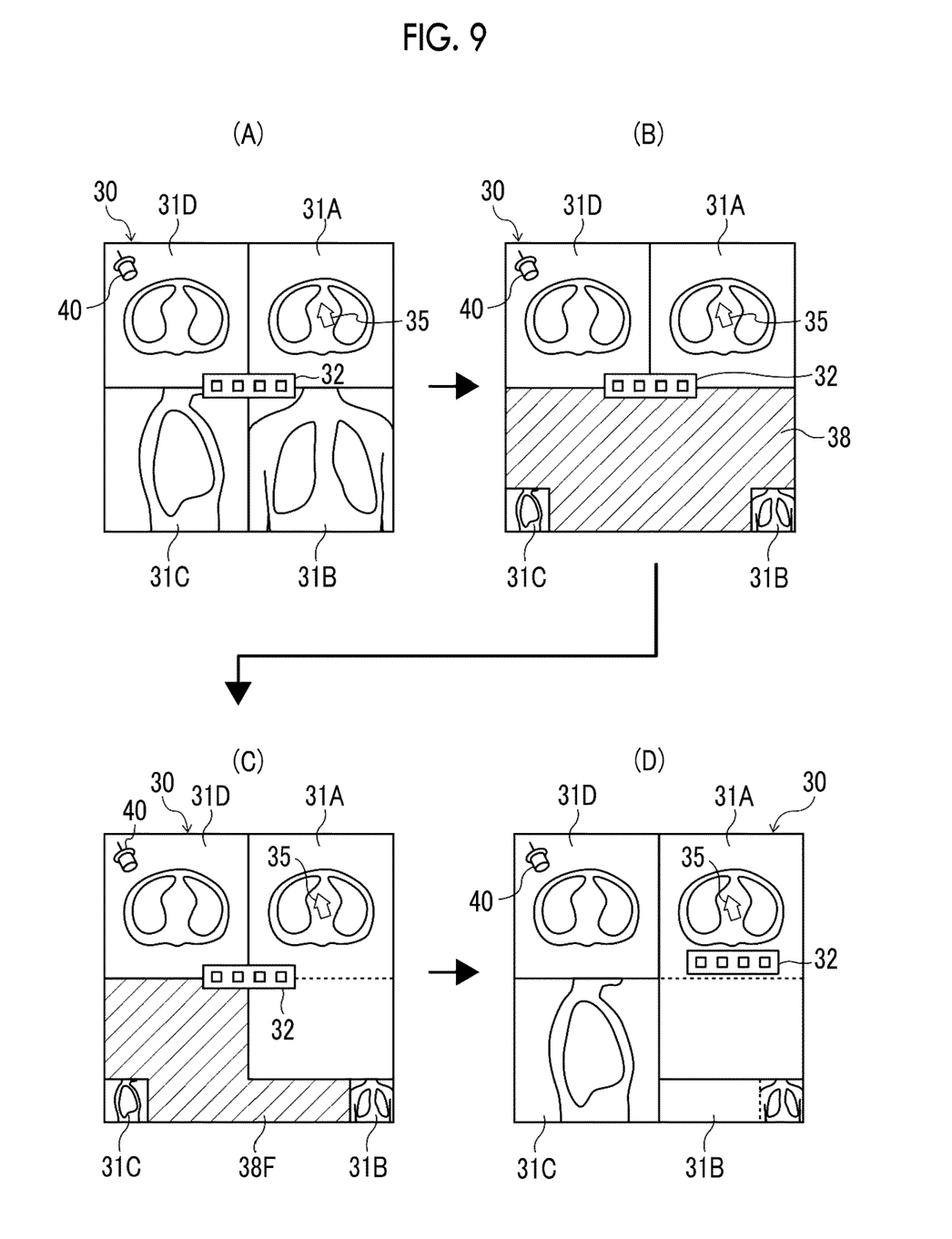
FIG. 9 is a diagram illustrating enlargement and reduction of the viewer on the display screen.

FIG. 9 is a diagram illustrating enlargement and reduction of the viewer in a case where the viewer set to be non-reducible is included. In FIG. 9, it is assumed that the viewer 31D is set to be non-reducible. Further, the fact that the viewer 31D is set to be non-reducible is indicated by assigning a pin icon 40 to the viewer 31D. As shown in (A) of FIG. 9, it is assumed that the display controller 22 receives the selection of the viewer 31A.

As shown in (B) of FIG. 9, the display controller 22 reduces the other viewers 31B and 31C other than the selected viewer 31A and the viewer 31D set to be non-reducible together with the disposed medical image. Even in this case, the relative positions of the four viewers 31A to 31D are maintained.

Next, as shown in (C) of FIG. 9, the display controller 22 enlarges the selected viewer 31A. In this case, as in FIG. 6, the display controller 22 enlarges the selected viewer 31A to have a maximum size suitable for the free region 38 other than the reduced viewers 31B and 31C. That is, the selected viewer 31A is enlarged to fit in the free region 38 as much as possible. In (C) of FIG. 9, the aspect ratio in the case where the selected viewer 31A is enlarged is not maintained, but the aspect ratio of the medical images disposed in the enlarged viewer 31A is maintained. In (C) of FIG. 9, the boundary of the medical images disposed in the enlarged viewer 31A is indicated by a broken line. In (C) of FIG. 9, the medical images disposed in the viewers 31A and 31D are not enlarged as a result.

Subsequently, the display controller 22 deforms the reduced viewers 31B and 31C to fill a remaining free region 38F even after the selected viewer 31A is enlarged. For example, as shown in (D) of FIG. 9, the viewer 31C, which is reduced to the maximum size that is suitable for the free region 38F after the viewer 31A is enlarged, is deformed, and the viewer 31B is deformed to fill the remaining free region. It should be noted that, even in a case where the viewers 31B and 31C are deformed, the medical images disposed in the viewers 31B and 31C are not deformed.

Further, the display controller 22 superimposes the GUI controller 32 on a region other than the region of interest in the medical image disposed in the enlarged viewers 31A and 31D, and ends the processing.

Further, in the above-described embodiment, the image displayed on the display screen 30 is used as the medical image, but the present disclosure is not limited thereto. It is needless to say that the technique of the present disclosure can also be applied even in a case where an image other than the medical image is displayed.

In addition, in the above-described embodiment, the display screen 30 includes the four viewers 31A to 31D of 2×2, but the number of viewers is not limited thereto. The display screen may include nine viewers of 3×3 or may include a larger number of viewers.

Further, in the above-described embodiment, for example, as a hardware structure of a processing unit that executes various processing such as processing performed by the image acquisition unit 21 and the display controller 22, the following various processors may be used. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). The plurality of processing units may be constituted by one processor.

As an example of configuring the plurality of processing units by one processor, first, as represented by a computer of a client, a server, and the like, there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more various processors described above.

Further, as the hardware structures of these various processors, more specifically, it is possible to use an electrical circuit (circuitry) in which circuit elements, such as semiconductor elements, are combined.

The supplementary notes of the present disclosure will be described below.

Supplementary Note 1

A display control apparatus comprising:
at least one processor,
in which the processor is configured to:
display a display screen including a plurality of display regions, each of which has at least one image disposed thereon, and an operation instruction region for giving an instruction to operate the image, and on which the plurality of display regions and the operation instruction region are initially disposed;
receive selection of at least one display region of the plurality of display regions;
reduce another display region other than the selected display region together with a disposed image and enlarge the selected display region together with a disposed image; and
superimpose the operation instruction region on a region other than a region of interest in the image disposed in the enlarged display region.

Supplementary Note 2

The display control apparatus according to supplementary note 1,
in which the processor is configured to,
in a case where selection of at least one display region different from the enlarged display region is received, enlarge the different display region together with a disposed image, and reduce a display region other than the different display region together with a disposed image, and
superimpose the operation instruction region on a region other than a region of interest in the image disposed in the enlarged different display region.

Supplementary Note 3

The display control apparatus according to supplementary note 1 or 2, in which the processor is configured to enlarge and reduce the plurality of display regions in a state where a relative position between the plurality of display regions is maintained.

Supplementary Note 4

The display control apparatus according to any one of supplementary notes 1 to 3, in which the processor is configured to receive selection of the display region by hovering a cursor by an operator.

Supplementary Note 5

The display control apparatus according to any one of supplementary notes 1 to 4, in which the processor is configured to reduce the other display region other than the selected display region to a predetermined minimum size, and
enlarge the selected display region to a maximum size suitable for a free region other than the reduced other display region on the display screen.

Supplementary Note 6

The display control apparatus according to supplementary note 5, in which the processor is configured to deform the reduced other display region such that the free region other than the enlarged display region and the reduced other display region is filled on the display screen.

Supplementary Note 7

The display control apparatus according to supplementary note 5 or 6, in which the processor is configured to set the minimum size according to an image disposed in the display region.

Supplementary Note 8

The display control apparatus according to any one of supplementary notes 1 to 7, in which the processor is configured to synchronously enlarge the selected two or more display regions, in a case where selection of two or more display regions is received.

Supplementary Note 9

The display control apparatus according to any one of supplementary notes 1 to 8, in which the processor is configured to return the plurality of display regions and the operation instruction region to the initial disposition, in a case where selection of the display region is released.

Supplementary Note 10

The display control apparatus according to any one of supplementary notes 1 to 9, in which the processor is configured to prohibit reduction of a display region, which is set to be non-reducible, from the initial disposition.

Supplementary Note 11

A display control method causing a computer to execute:
displaying a display screen including a plurality of display regions, each of which has at least one image disposed thereon, and an operation instruction region for giving an instruction to operate the image, and on which the plurality of display regions and the operation instruction region are initially disposed;
receiving selection of at least one display region of the plurality of display regions;
reducing another display region other than the selected display region together with a disposed image and enlarging the selected display region together with a disposed image; and
superimposing the operation instruction region on a region other than a region of interest in the image disposed in the enlarged display region.

Supplementary Note 12

A display control program causing a computer to execute:
a procedure of displaying a display screen including a plurality of display regions, each of which has at least one image disposed thereon, and an operation instruction region for giving an instruction to operate the image, and on which the plurality of display regions and the operation instruction region are initially disposed;
a procedure of receiving selection of at least one display region of the plurality of display regions;
a procedure of reducing another display region other than the selected display region together with a disposed image and enlarging the selected display region together with a disposed image; and
a procedure of superimposing the operation instruction region on a region other than a region of interest in the image disposed in the enlarged display region.

What is claimed is:

1. A display control apparatus comprising:
at least one processor,
wherein the processor is configured to:
display a display screen including a plurality of display regions, each of which has at least one image disposed thereon, and an operation instruction region for giving an instruction to operate the image, and on which the plurality of display regions and the operation instruction region are initially disposed;
receive a selection operation performed on a first portion of the plurality of display regions, reduce a remaining portion, excluding the first portion of the plurality of display regions, and enlarge the first portion of the plurality of display regions, wherein each display region in the remaining portion is reduced to a predetermined size smaller than the first portion; and
superimpose the operation instruction region on a region other than a region of interest in the image disposed in the enlarged display region.

2. The display control apparatus according to claim 1, wherein the processor is configured to,
in a case where another selection operation performed on a display region different from the enlarged first portion is received, enlarge the different display region together with a disposed image, and reduce a display region other than the different display region together with a disposed image, and
superimpose the operation instruction region on a region other than a region of interest in the image disposed in the enlarged different display region.

3. The display control apparatus according to claim 1, wherein the processor is configured to enlarge and reduce the plurality of display regions in a state where a relative position between the plurality of display regions is maintained.

4. The display control apparatus according to claim 1, wherein the processor is configured to receive the selection operation performed on the first portion of the plurality of display regions by hovering a cursor by an operator.

5. The display control apparatus according to claim 1, wherein the processor is configured to reduce the each display region in the remaining portion to a predetermined minimum size, and
enlarge the first portion to a maximum size suitable for a free region other than the remaining portion on the display screen.

6. The display control apparatus according to claim 5, wherein the processor is configured to deform the reduced each display region in the remaining portion such that the free region is filled on the display screen.

7. The display control apparatus according to claim 5, wherein the processor is configured to set the predetermined minimum size according to an image disposed in the display region.

8. The display control apparatus according to claim 1, wherein the processor is configured to return the plurality of display regions and the operation instruction region to the initial disposition, in a case where the selection operation performed on the first portion of the plurality of display regions is released.

9. The display control apparatus according to claim 1, wherein the processor is configured to prohibit reduction of a display region, which is set to be non-reducible, from the initial disposition.

10. The display control apparatus according to claim 1, wherein the operation instruction region is superimposed on at position at which the operation instruction region does not overlap with the region of interest.

11. The display control apparatus according to claim 1, wherein the operation instruction region is superimposed on at position at which an overlap between the operation instruction region and the region of interest is minimized.

12. A display control method causing a computer to execute:
    displaying a display screen including a plurality of display regions, each of which has at least one image disposed thereon, and an operation instruction region for giving an instruction to operate the image, and on which the plurality of display regions and the operation instruction region are initially disposed;
    receiving a selection operation performed on a first portion of the plurality of display regions, reducing a remaining portion, excluding the first portion of the plurality of display regions, and enlarging the first portion of the plurality of display regions, wherein each display region in the remaining portion is reduced to a predetermined size smaller than the first portion; and
    superimposing the operation instruction region on a region other than a region of interest in the image disposed in the enlarged display region.

13. A non-transitory computer-readable storage medium that stores a display control program causing a computer to execute:
    a procedure of displaying a display screen including a plurality of display regions, each of which has at least one image disposed thereon, and an operation instruction region for giving an instruction to operate the image, and on which the plurality of display regions and the operation instruction region are initially disposed;
    a procedure of receiving a selection operation performed on a first portion of the plurality of display regions, reducing a remaining portion, excluding the first portion of the plurality of display regions, and enlarging the first portion of the plurality of display regions, wherein each display region in the remaining portion is reduced to a predetermined size smaller than the first portion; and
    a procedure of superimposing the operation instruction region on a region other than a region of interest in the image disposed in the enlarged display region.

* * * * *